July 6, 1937.  C. A. HOLMBLAD  2,086,267
MERIT INDICATOR
Filed April 3, 1934
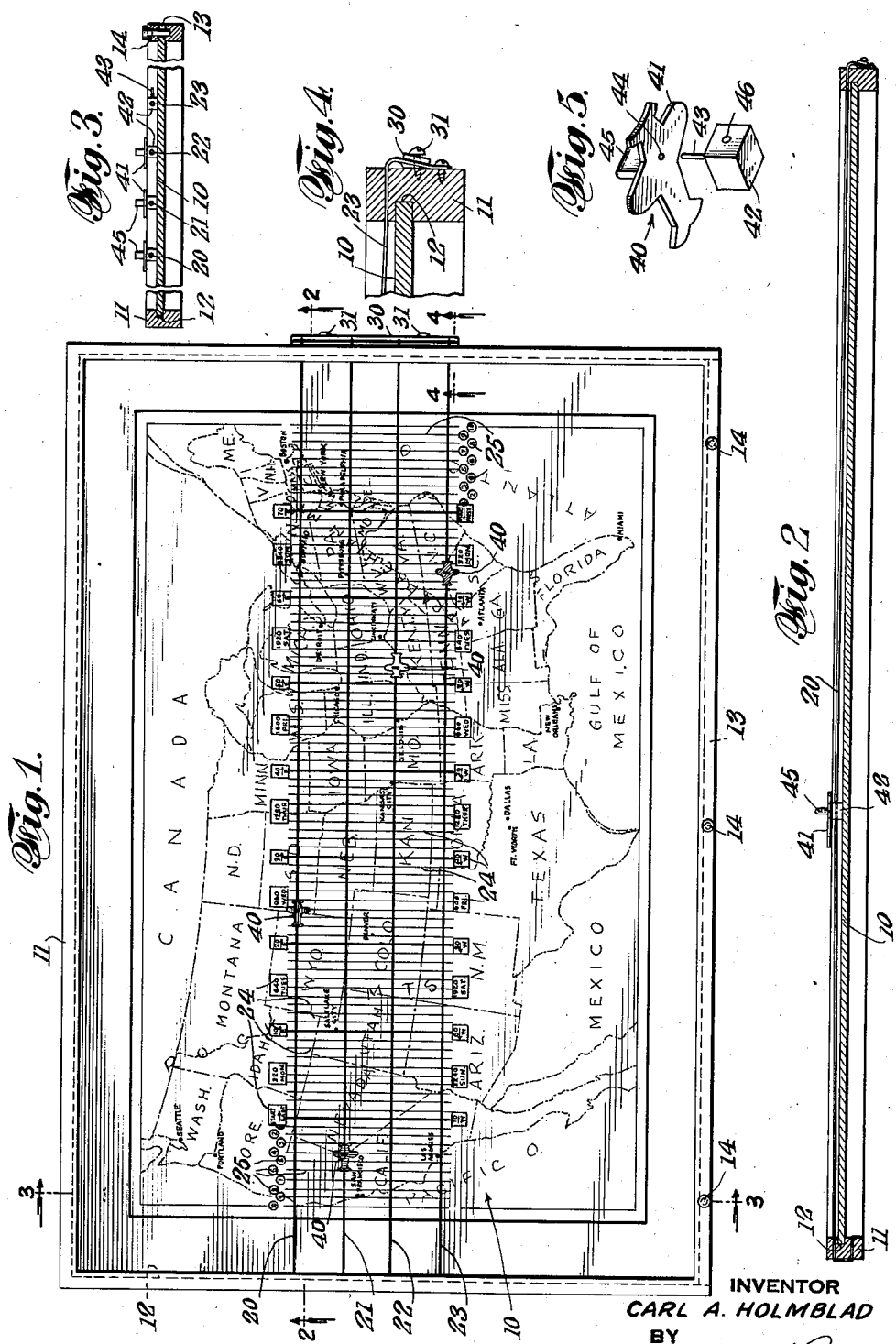
INVENTOR
CARL A. HOLMBLAD
BY
ATTORNEYS Patented July 6, 1937

2,086,267

UNITED STATES PATENT OFFICE 2,086,267

MERIT INDICATOR

Carl A. Holmblad, Flushing, N. Y.

Application April 3, 1934, Serial No. 718,822

10 Claims. (Cl. 35—23)

This invention relates to merit indicators, primarily for children. The primary object of the invention is an indicator which will be educational, which will have the incentive of a game, which will inspire the child or children using the device to strive for proficiency, and which will accurately indicate the progress made by the child or children.

Further objects of the invention will be apparent as this specification progresses.

The indicator embodies and functions in relation to a map. Preferably the maps employed are interchangeable, so that the one in use may be the map which the children using the indicator are currently studying or particularly interested in for one reason or another. The indicator is preferably such that the grading of the children is done daily either by the children themselves or in the presence of them, so that in connection with the grading the attention of the children is held by the map employed and the study of geography made attractive.

The map employed has one or more courses of travel designated thereacross. These courses of travel have distance markers at intervals therealong and preferably are also divided into calendar intervals with appropriate markers, so that as progress is made along the course there will be accurate markers for the distance travelled in the calendar intervals designated, for example, daily. These distance markers are educational in that the children are taught the mileage travelled along the course and the distance between the various geographical points on the map, as, for example, the distance between cities, lakes, rivers, mountain ranges or peaks, as well as the size of the geographical divisions of the map.

It is convenient to provide also a demerit scale which may take the form of demerit markers on the map, particularly at the end of the course or courses where the start is made; for the child or children employing the indicator may on the start of the course have demerits which not only prevent progress the first day, but set the child or children back at the start of the course. After a fair start has been made along the course, the demerits may be taken care of by the regular course markers.

A symbol is preferably employed to indicate the progress made along each course. These symbols may take any desired form, such as airplanes, automobiles, locomotives, men or women, animals, birds, etc., so as to give the indicator the character of a game. For example, where there is a plurality of courses, the same symbols may be employed and the grading takes on the character of a race between them, e. g., an airplane race across the country. Or different symbols may be employed and the race, for instance, be between an airplane and a locomotive, or a fox and a hound, or a tortoise and a hare, or a horse and an automobile, etc., any variety of symbols being contemplated herein.

As the grading starts, progress is intended to be inspired by the desire of the child or children to obtain certain objectives on the map from time to time, as from day to day. Thus, for example, if airplanes are employed, the child or children will seek to land where there is a landing field and not on a perilous mountain range or in the middle of a lake, and this coupled with the racing feature offers an incentive to progress in the lines graded.

The symbols are preferably mounted on guides which extend over and in fact determine or designate the courses travelled. The relation of the map, symbol and guide is preferably such that when the symbol has been moved to the desired point on the map in accordance with the grading attained, it tends to remain at that point until intentionally moved forward or backward therefrom, depending on merit or demerit. Thus, with the markers accurately spaced on the map, the points attained during the calendar intervals are accurately and fixedly indicated.

The course or courses may be variously employed in grading. For example, if the indicator is equipped with but a single course, this may be specified for grading in a single subject matter, e. g., a particular subject matter of study or some particular conduct or the development of some particular characteristic. In such instance, the course would quite likely be employed in the grading of a single child. Where a plurality of courses are provided and if a single child is to use all of them, each of the courses may have its own designation for grading. If the courses are to be employed by several children, the children may each be given a course, and all of the courses may be given the same designation or different designations as desired. In this respect, the indicator is obviously subject to considerable variation.

In the drawing which forms a part hereof, I have shown rather sketchily a map of the United States with four courses from west to east and east to west, extending thereacross, in connection with which I have illustrated two sets of markers, common to the four courses. It will be apparent that the number of courses is optional and that if desired separate markers for each course may be employed. I have also illustrated airplanes as the symbols to be employed. From the foregoing, it will be understood that the map and the symbols to be employed are optional. No limitation, therefore, is to be inferred from these details of the showing chosen for illustrative purposes.

In the drawing:

Figure 1 is a plan of the indicator with symbols mounted erect for use;

Fig. 2 is a horizontal somewhat enlarged cross section on the line 2—2 of Fig. 1;

Fig. 3 is a vertical cross section broken away on the line 3—3 of Fig. 1;

Fig. 4 is a cross sectional detail on the line 4—4 of Fig. 1 illustrating optional tension means employed in connection with the guides for the symbols above referred to;

Fig. 5 is a detail illustrating in perspective a symbol made in two parts.

The map 10 of the indicator, of rigid structure or backing, is suitably mounted in a frame 11. The map and frame are shown as rectangular. The four sides of the frame are each provided with grooves 12 in which the map fits and is mounted. The groove on one member of the frame, for example, the lower member, is continued through the said member as a slot 13 to permit of interchangeability of the maps. Removable pins 14 may be supplied in suitable apertures transverse the slot for maintaining the map in position in the frame, or supporting the map when the indicator is hung.

The map is shown with four courses as above set forth which are determined or designated by the symbol guides 20, 21, 22, and 23. For convenience of illustration, these courses are shown as straight line courses across the map. Obviously they are not limited to straight line courses as the guides for the symbols may be given the desired contour, as, for example, the contour of the actual airplane, railroad or automobile highway lines across country, particularly where the same map is always to be used.

The courses are provided with markers 24, which are arranged at intervals therealong and which indicate the commencement and end of the courses and the distances travelled in the calendar division or divisions, and may also indicate the maximum grades attainable.

As herein shown, the courses are intended to be travelled in both directions, starting at one side of the map and terminating at the other side of the map where a start is made for a return along the courses to the original starting point. The marker at the western side of the map indicating the starting line may conveniently consist of or bear the insignia "Start east", together with an arrow pointing eastward. It will be understood that this marker indicates also the finish of the courses from east to west. The marker at the eastern side of the map indicating the starting line may conveniently consist of or bear the insignia "Start west", together with an arrow pointing westward. It will be understood that this marker indicates also the finish of the courses from west to east. These markers may be arbitrarily placed at any desired point on the map. As shown, they are placed at a distance apart of 2,240 miles, the marker "Start east" being located a little to the east of Los Angeles, and the marker "Start west" a little to the west of Philadelphia.

This location of these markers is to provide space at the extremities of the courses for the demerit scales represented by demerit markers 25, one set at each end of the courses, which may conveniently consist of or bear the insignia "1", "2", "3", "4", "5", "6", "7", "8", "9", "10".

Where it is desired to indicate daily progress made from week to week as herein shown, the distance between the markers "Start east" and "Start west" is divided into seven equal divisions of 320 miles each, and for convenience in marking, each of the divisions is in turn divided into 10 sub-divisions of 32 miles each. It is desirable that the demerit markers be arranged to indicate sub-divisions of the same distance as the sub-divisions within the courses.

The mileage in each division may be separately indicated in the markers, or the markers may indicate the total mileage along the respective courses, as herein shown, and with this distance indication may conveniently be included the day of the week. The markers for eastern travel, starting from the western side of the courses, bear the insignia "320 Mon.", "640 Tues.", "960 Wed.", "1280 Thur.", "1600 Fri.", "1920 Sat." "2240 Sun.". Those for western travel, starting from the eastern side of the courses, bear the same insignia, but, of course, in reverse order.

At the division lines of the courses, the markers may conveniently, as herein shown, consist of or bear insignia indicating direction and also insignia indicating the number of sub-divisions which are indicative of the points arbitrarily chosen for marking. As here illustrated, there are 10 points for a perfect day's grading, and the division line markers are accumulative in the grading up to 70 points for the week. Arrows are conveniently included in these markings, which read respectively for eastward travel from the western boundary line, "10 E", "20 E", "30 E", "40 E", "50 E", "60 E"; and the marker "70 E" is placed at the termination of the courses in line with the starting marker "Start west". The same marking for westward travel from the eastern boundary line is employed at the division marks westward, but, of course, in reverse order, with the marker "70 W" in line with the starting marker "Start east".

The markers above described are arranged in two sets, those for eastern travel together with the demerit markers for like direction above the top course, and those for western travel together with the demerit markers for like direction below the bottom course, and the corresponding markers of each set are conveniently connected with vertical lines drawn on the map, so that the two sets of markers serve for all of the courses.

The markers may be affixed to the map in any desired way, e. g., they may be printed on the map, placed thereon as pasters, erected as signposts, etc. As herein shown, they are printed on the map.

The guides 20, 21, 22, and 23 are herein illustrated as being of wire. They are suitably mounted in the frame 11, as through apertures individual to the wires passing through the frame in close proximity to the map with suitable fastening means at the ends of the wires. At one side of the frame conventional tension means, such as the cleat 30 and the screw 31 (preferably one screw for each wire), may be employed for regulating the tension of the wires.

The symbols 40, here illustrated as airplanes as above set forth, are slidably mounted, one each on the guide wires 20, 21, 22, and 23. As in the illustrative showing, the intent is to reverse the direction of travel at the ends of the courses, the symbols are shown as made in two pieces for proper heading in the courses, to wit, the design (airplane) piece 41 and the base piece 42 with suitable connecting means between them, such as the pin 43, which may be mounted either on the base piece or on the design piece as desired (here shown as mounted on the base piece) and a cooperating bearing or aperture 44 in the other piece (here shown as the design piece). By this arrangement the design portion of the symbol may be reversed at the end of the course and pointed in the opposite direction for return travel along the course. With some symbols, such as with airplanes, it is convenient to have a thumb piece 45 mounted on the top of the symbol for actuating the same.

The mounting of the symbol on its guide wire is here shown as by passing the wire through a hole 46 which extends completely through the mounting piece. As the wires illustrated are circular in cross section, this mounting permits the base piece to be rotated on the guide wire so that the pin 43, which normally may extend above the edges of the frame, may be turned down sidewise when desired, as for packing the indicator for shipment. Note the right-hand base piece and pin in Fig. 3. The same would be true in a one-piece symbol where the design portion extends above the edges of the frame when upright and in use.

That portion of the base part of the symbol which when in use lies between the guide wire and the map is preferably longer in vertical dimension than the dimension from the apertures in the frame through which the guide wires extend to the face of the map. This causes the guide wires to bow up slightly upward at the symbol as illustrated in Fig. 2, with a resultant pressure on the symbol tending to maintain it at the point on the map to which it is moved for grading. The tension of the wire, however, will be so regulated that when it is desired to move the symbol, the symbol may be lifted slightly out of contact with the map for movement.

While from the foregoing the operation of the indicator should be apparent, the following simple example is given for illustrative purposes: Assume that one child, a boy, is to use the indicator and that the courses from the top downward are arbitrarily given the designation of (1) Exercises; (2) Manners and cleanliness; (3) Arithmetic; and (4) Initiative. For adding interest to the grading and to the game, the airplanes for the four courses may be colored, for example, blue, red, white and green. On Monday morning, the four planes are placed at the "Start east" marker, facing east. The boy proceeds with his morning exercises and the blue plane is moved to the sub-division representing the grade that he attains, say to the fifth subdivison line of the division bearing the Monday marker. After the evening meal, he goes through his bedtime exercises and makes another 5, giving him a perfect score of 320 miles for the first day and placing the blue airplane at the division marker "10 E".

Proceeding now to the second course and the red plane, the boy may be given 2 points for his bath before breakfast and the red plane moved to the second sub-division line; and in keeping his hands and face and teeth clean throughout the day, he may with an effort make 2 additional points, advancing the red plane to the fourth sub-division line; but because of good behavior, to this score of 4 may be added 4 additional points for manners, advancing the red plane to the eighth sub-division line, giving the boy a total of 256 miles on the second course.

Proceeding now to the third course and the white plane, the boy may have considerable difficulty with his arithmetic, and not only get it all wrong but in such a way that he receives 2 demerit marks. The white plane is then moved back to the demerit marker "2".

Proceeding now to the fourth course and the green plane, the boy's initiative throughout the day may be 6 points attained at various times, advancing the green plane to the sixth sub-division line, and giving the boy a total of 192 miles on the fourth course.

Tuesday morning the four scores may be noted for the weekly accumulative marking and the four planes all placed at the marker "10 E" for a fresh start, or they may be started for the Tuesday grading from the positions acquired by the planes at the close of Monday night. The same procedure of advancing the planes or moving them backward is adopted for Tuesday as above set forth for Monday. If there are demerit marks, they may conveniently be counted backward on the sub-division lines of the courses and into the demerit territory if necessary, from the position of the plane Tuesday morning under either method of procedure.

This procedure continues throughout the week and the scores are noted Sunday night either by addition of the mileage attained in each course each day if the planes are moved to the division markers in the mornings, or by the position of the planes in the courses if they are started each morning from the positions attained the previous morning.

On the Monday morning following the week's travel, the planes are all moved to the marker "Start west" and reversed on the pins 43, and the western journeys across the map made in like manner as were the eastern journeys.

For reasons above pointed out, it is thought that where several children are being graded and one course and plane assigned to each child, the operation of the indicator will be apparent without illustration.

The indicator has a wide field of use, including use in the home, in kindergartens and schools, orphan asylums, in hospitals, at playgrounds, at drilling armories or fields, at camps, etc. The choice of symbols may be made consistent with the field of use to which the indicator is put, and may contribute much to the incentive of the child or children in this field of use.

The foregoing detailed description has been given for clearness of understanding and no undue limitation should be deduced therefrom, but the appended claims should be construed as broadly as possible in view of the prior art.

Having thus described my invention, I claim:

1. In a device of the character described, the combination with a map, of a designated course of travel thereon, indicative markers at intervals along that course, a physical object serving as a symbol movable along the course, a guide adjacent the course on which the said object is mounted for travel, a releasable tension means for maintaining the said object in its adjusted position on the said guide until forcibly moved from that position.

2. In a device of the character described, the combination with a map, of a designated course of travel thereon, markers at intervals along that course indicative of distance travelled, a demerit scale at the extremity of the course, a physical object serving as a symbol movable along the course, a guide adjacent the course on which the said object is mounted for travel, a releasable tension means for maintaining the said object in its adjusted position on the said guide until forcibly moved from that position.

3. In a device of the character described, the combination with a map, of a designated course of travel thereon, markers at intervals along that course indicative of distance travelled and dividing the course into calendar intervals, a demerit scale at the extremity of the course, a physical object serving as a symbol movable along the course, a guide adjacent the course on which the said object is mounted for travel, a releasable tension means for maintaining the said object in its adjusted position on the said guide until forcibly moved from that position.

4. In a device of the character described, the combination with a map, of a designated course of travel thereon, duplicate markers at intervals along that course, one set being indicative of the distance travelled in one direction and the other set being indicative of the distance travelled in the opposite direction, a reversible physical object symbolic of motion having a forward portion and a rear portion indicative of the direction of the normal line of travel movable along the course, a guide adjacent the course on which the said object is mounted for travel, a releasable tension means for maintaining the said object in its adjusted position on the said guide until forcibly moved from that position.

5. In a device of the character described, the combination with a map, of a designated course of travel thereon, indicative markers at intervals along that course, a physical object serving as a symbol movable along the course, a guide wire adjacent the course on which the said object is mounted for travel, and mounting means for the guide wire, the tension of the guide wire and the mounting thereof being such that when the said object is at rest it is in contact with the map and under slight pressure thereon, but when it is desired to move the said object from one point to another on the map the said object may be raised out of contact with the map.

6. In a device of the character described, the combination with a map, of a designated course of travel thereon, indicative markers at intervals along that course, a physical object serving as a symbol movable along the course, a guide wire adjacent the course on which the said object is mounted for travel, mounting means for the guide wire, the tension of the guide wire and the mounting thereof being such that when the said object is at rest it is in contact with the map and under slight pressure thereon, but when it is desired to move the said object from one point to another on the map the said object may be raised out of contact with the map, and means for regulating the tension of the wire.

7. In a device of the character described, the combination with a map, of a plurality of designated courses of travel thereon, duplicate markers at intervals along those courses, one set being indicative of the distance travelled in one direction and the other set being indicative of the distance travelled in the opposite direction, the two sets of markers being so placed as to suffice for all of the designated courses of travel, demerit scales at the extremities of the course, a reversible physical object symbolic of motion and having a forward portion and a rear portion indicative of the direction of the normal line of travel movable along each course, and a guide adjacent each course on which the said object is mounted for travel, the map, the said objects and the guides being so organized that when one of said objects has been moved to the desired point on its course it tends to remain at that point unless forcibly moved therefrom.

8. In a device of the character described, the combination with a map, of a frame in which the map is mounted, a designated course of travel on the map, a physical object serving as a symbol movable along the course, and a guide wire mounted on the frame adjacent the course on which guide wire the said object is mounted for travel, the said object when upright having a portion extending between the guide wire and the map and when moved to the desired point on the map being held in frictional contact with the map by the tension of the guide wire, the tension of the wire being such that the said object may be raised out of contact with the map for movement from point to point, the said object being rotatably mounted on the wire so that it may be turned side-wise and when so turned will lie below the upper edges of the frame.

9. In a device of the character described, the combination with a map, of a frame in which the map is mounted, a designated course of travel on the map, a physical object serving as a symbol movable along the course, and a guide wire mounted on the frame adjacent the course on which guide wire the said object is mounted for travel, the said object being formed in two pieces, one piece being mounted on the guide wire and when upright having a portion extending between the guide wire and the map and when moved to the desired point on the map being held in frictional contact with the map by the tension of the guide wire, the tension of the guide wire being such that the said object may be raised out of contact with the map for movement from point to point, said portion of the said object having a pin normally projecting upwardly therefrom on which pin is removably mounted the second portion of the said object being the design portion thereof, the first specified portion of the said object being rotatably mounted on the wire so that when the design portion of the said object is removed it may be turned sidewise and when so turned the pin will lie below the upper edges of the frame.

10. In a device of the character described, the combination with a map, of a frame in which the map is mounted, one side of the frame being provided with a slot which permits interchangeability of maps suitable for mounting thereon, a designated course of travel on the map mounted in the frame, indicative markers at intervals along that course, a physical object serving as a symbol movable along the course, and a guide adjacent the course on which the symbol is mounted for travel, the map, said object and guide being so organized that when the said object has been moved to the desired point on the course the said object tends to remain at that point unless forcibly moved therefrom.

CARL A. HOLMBLAD.